(12) United States Patent
Markham et al.

(10) Patent No.: US 8,393,300 B2
(45) Date of Patent: Mar. 12, 2013

(54) PET TOY WITH FLEXIBLE BODY AND ROPE SUPPORT CONFIGURATIONS

(75) Inventors: Joseph P. Markham, Arvada, CO (US);
Chuck Costello, Louisville, CO (US);
Sabine Crane, San Clemente, CA (US)

(73) Assignee: The Kong Company, LLC, Golden, CO (US)

( * ) Notice: Subject to any disclaimer, the term of this patent is extended or adjusted under 35 U.S.C. 154(b) by 56 days.

(21) Appl. No.: 12/964,541

(22) Filed: Dec. 9, 2010

(65) Prior Publication Data

US 2012/0145089 A1      Jun. 14, 2012

(51) Int. Cl.
*A01K 29/00*      (2006.01)
(52) U.S. Cl. ..................................... 119/709; D30/160
(58) Field of Classification Search .................. 119/702, 119/707–711; 446/72–73, 369, 385, 74; D30/160
See application file for complete search history.

(56) References Cited

U.S. PATENT DOCUMENTS

| | | | | |
|---|---|---|---|---|
| 2,324,277 | A | * | 7/1943 | Casey et al. ..................... 40/327 |
| 2,812,616 | A | * | 11/1957 | Ford ................................ 446/374 |
| 3,333,360 | A | * | 8/1967 | Hardy ............................. 446/369 |
| 3,395,484 | A | * | 8/1968 | Smith ............................. 446/374 |
| 3,476,086 | A | * | 11/1969 | Way ................................ 119/709 |
| 5,238,241 | A | * | 8/1993 | Christensen .................. 473/424 |
| 5,367,986 | A | | 11/1994 | O'Rourke et al. |
| D358,911 | S | * | 5/1995 | Hotta et al. ................... D30/160 |
| D371,645 | S | * | 7/1996 | Lawson ......................... D30/160 |
| 5,560,320 | A | | 10/1996 | Plunk |
| 5,630,745 | A | * | 5/1997 | Yeh ................................ 446/374 |
| 5,961,406 | A | * | 10/1999 | Hass .............................. 473/576 |
| 6,250,254 | B1 | | 6/2001 | Weinacker |
| D453,241 | S | * | 1/2002 | Kaplan ......................... D30/160 |
| 6,565,404 | B2 | | 5/2003 | Oblack |
| 6,571,742 | B1 | | 6/2003 | Tsengas |
| D496,771 | S | | 10/2004 | Tepper et al. |
| D505,233 | S | | 5/2005 | Viola |
| 7,201,117 | B2 | | 4/2007 | Ritchey et al. |

(Continued)

OTHER PUBLICATIONS

Penn Plax Dog Catalog, Toys. Feb. 12, 2009, retrieved from the internet at http://www.pennplax.com/Dog.html, click "Toys", 9 pages.

(Continued)

*Primary Examiner* — Rob Swiatek
*Assistant Examiner* — Ebony Evans
(74) *Attorney, Agent, or Firm* — Sheridan Ross PC

(57) ABSTRACT

A pet toy includes a flexible body with rope support configurations. In one embodiment, the rope configurations include one or more loops that are exposed and one or more knots that are covered by an exterior plush component of the pet toy. In another embodiment, two or more strands of rope material are tied in a series of knots, and an additional strand of rope material may be tied to the other strands in a transverse fashion. Preferably, the exterior plush component includes fabric. One or more of the free ends of the strands of rope material may also protrude beyond the plush component. The fabric material is sewn over the exposed portions of the rope material. Enough fabric material is used such that twisting, extending and retracting the rope material does not transfer force directly to the exterior fabric, thereby preserving the exterior plush component. The knots provide internal bulk to the body of the toy eliminating the need for stuffing. The knots also provide a robust structure for biting and tugging that can aid in dental cleaning. The exposed loops or free ends of the rope material act as handles for grasping by the pet owner or animal.

16 Claims, 4 Drawing Sheets

U.S. PATENT DOCUMENTS

| | | | |
|---|---|---|---|
| 7,207,294 | B2 | 4/2007 | Stasio |
| RE40,430 | E | 7/2008 | Markham |
| RE40,533 | E | 10/2008 | Oblack |
| 7,644,684 | B2 | 1/2010 | Ritchey |
| D651,771 | S * | 1/2012 | Shanghui ............... D30/160 |
| 2003/0226521 | A1 | 12/2003 | Dobihal |
| 2004/0200433 | A1 | 10/2004 | Oblack |
| 2006/0048719 | A1 | 3/2006 | Myers |
| 2006/0162672 | A1 * | 7/2006 | Dokken ..................... 119/707 |
| 2006/0260560 | A1 * | 11/2006 | Renforth et al. ............ 119/707 |
| 2007/0234969 | A1 * | 10/2007 | Lynch ....................... 119/707 |
| 2009/0255080 | A1 * | 10/2009 | Lozinik .................... 15/229.13 |

OTHER PUBLICATIONS

International Search Report for International (PCT) Patent Application No. PCT/US2010/061524, mailed Jun. 15, 2011 2 pages.

Written Opinion for International (PCT) Patent Application No. PCT/US2010/061524, mailed Jun. 15, 2011 6 pages.

Applicant's admitted prior art: Kong Braidz Tug Toys, Kong Dental with Rope, Air KONG Stick With Rope, 3 pages.

Moppets—Rope Tugs, Gnaw It Teethers, and Petstages Rag Rope Balls, available at http://www.pet-shop.net/html/rope.html, printed May 4, 2010, 2 pages.

Photos of SPOT Mop-Pets Monkey™, 5 pages.

Ruffin It Monkey Ring Toss Squeak Toy, accessed at http://www.dog.com/item/ruffinit-monkey-ring-toss-squeak-toy/C11523/, printed May 4, 2010, 1 page.

Dog or Puppy Toy Baby Luv Plush Blue . . . , 3 Assorted Plush Paw Dog Toys on Tug . . . , Frisbee rope dog toy with Large Plus . . . , and Squeaky Octopus Dog Pull Cotton Rope . . . , accessed at http://ropedogtoys.com/, printed May 4, 2010, 2 pages.

Old Navy Rope-Icon Chew Toys for Dogs and ToyShoppe Rope Tennis Ball Toys for Small Dogs Plush Cat Rope, accessed at http://www.google.com/products?hl=en&q=rope+toys+for+dogs&um1&ie=UTF-8&ei=vb . . . , printed May 4, 2010, 1 page.

* cited by examiner

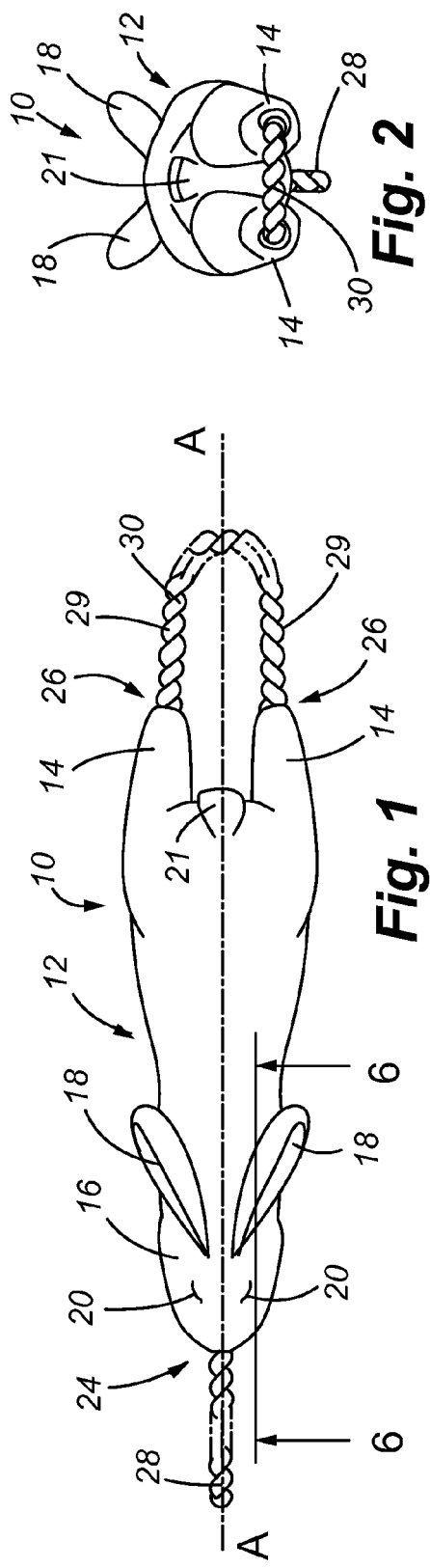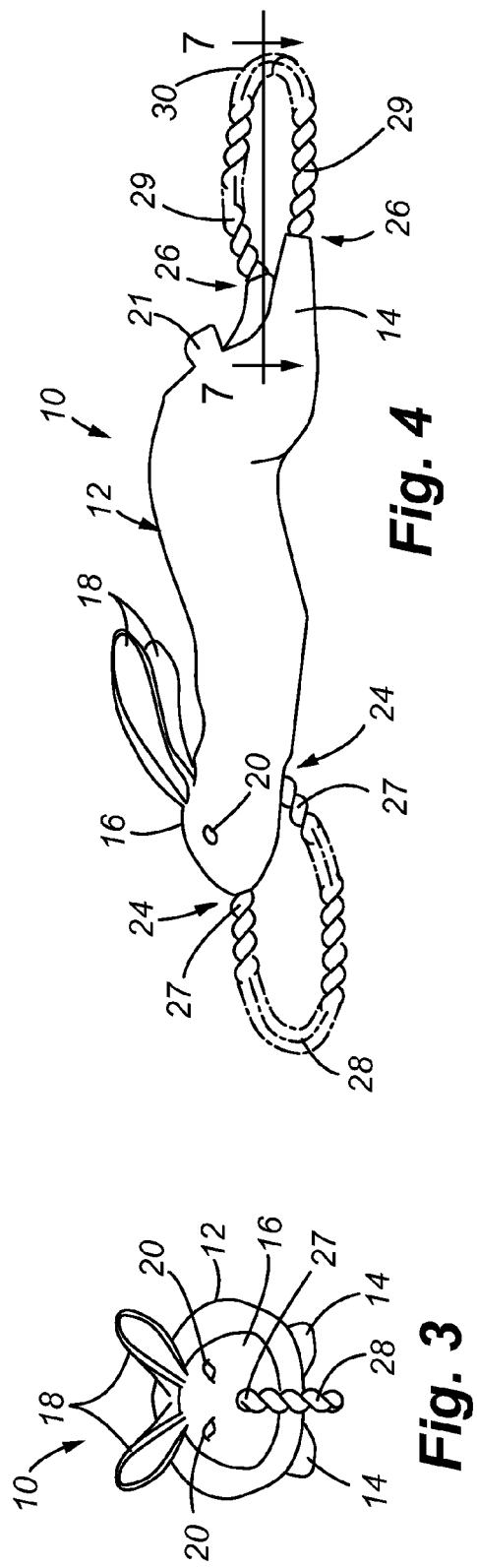

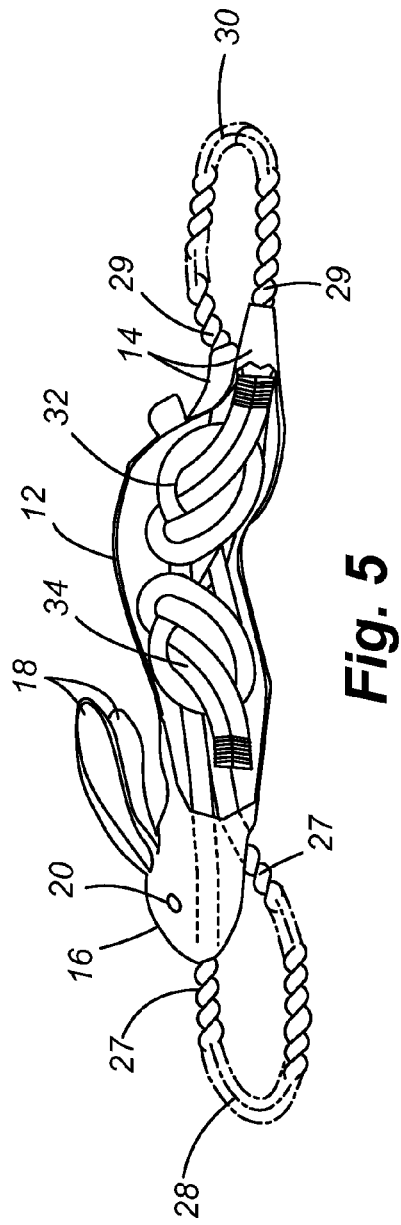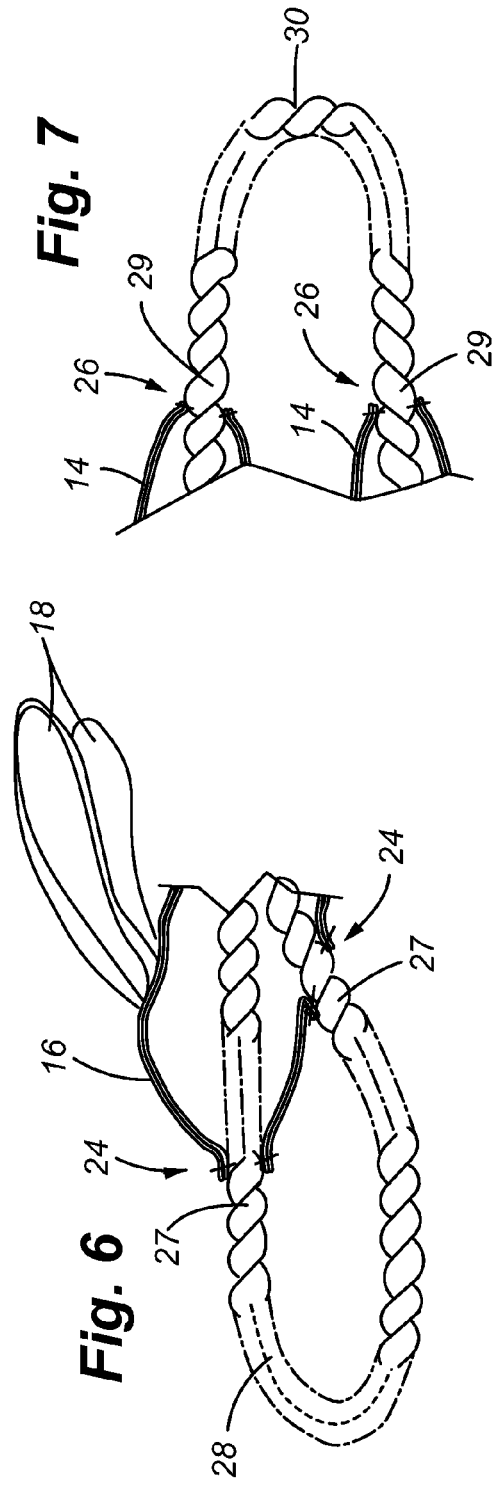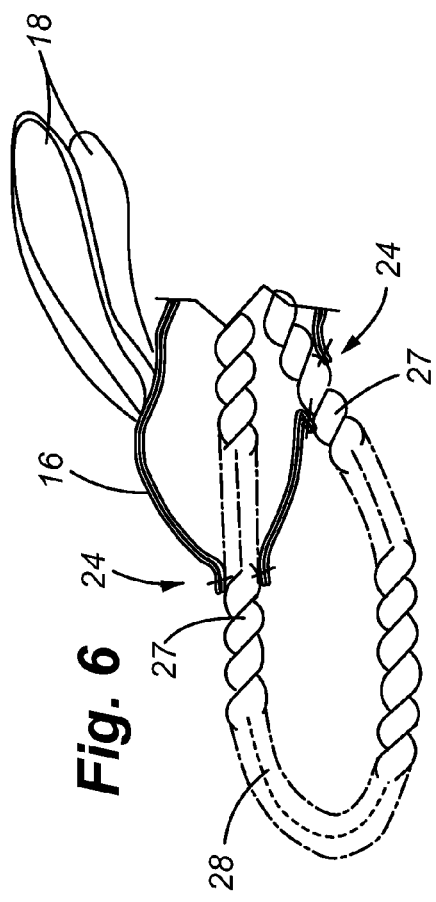

PET TOY WITH FLEXIBLE BODY AND ROPE SUPPORT CONFIGURATIONS

FIELD OF THE INVENTION

The invention relates to pet toys, and more particularly, to plush toys having fabric exteriors used with cord or rope material for support.

BACKGROUND OF THE INVENTION

There are a multitude of pet toys made from rubber or plastic. There are also a multitude of pet toys constructed from fabric and rope. For pet toys made from fabric and rope, one of the objects of these pet toys is to provide a flexible, yet resilient toy that an animal may chew and play tug of war with an owner or with another animal. One known configuration is use of a length of rope or cord in combination with a fabric exterior in which the animal may grasp one end of the rope/cord, and the other can be grasped by the owner, or maybe held in the mouth of another animal, so the animal may engage in a tugging contest.

One shortcoming with the prior art pet toys utilizing fabric and rope is that the fabric is easily torn by the tugging action. The fabric material also may be compromised by the normal biting action of the animal resulting in the fabric being destroyed in a relatively short time period.

Another shortcoming in the prior art is the release of stuffing which is placed within the pet toy once the fabric material has been compromised. Generally, it is undesirable for the fabric material to be torn, since some of the fabric material, as well as the stuffing, may be ingested by the animal.

Examples of patent references that disclose rope toys and/or plush toys include U.S. Pat. Nos. 7,644,684; 6,250,254; D505,233; and D496,771.

SUMMARY OF THE INVENTION

The present invention is a pet toy with a flexible body made from fabric, and rope support configurations disposed within the body that provide bulk and support for the overlying fabric. In one preferred embodiment, at least one portion of the rope support configuration takes the form of an exposed rope loop extending away from the body that may be grasped by the animal or pet owner. In other embodiments, an exposed length of rope may protrude beyond the body for grasping by the animal or pet owner. The term "rope" used herein is intended to broadly cover a range of related materials to include both natural and synthetic rope, cord, twine, and any other material comprising strands of flexible material woven to form a single larger strand. The term "fabric" is intended to broadly cover any type of cloth material.

In one preferred embodiment, there is at least one, but preferably two opposing exposed loops of rope material, one located at each end of the toy.

In one preferred rope support configuration, the rope material is provided in two interlocking loops, each loop being formed by a knot in the corresponding length of rope. Preferably, the loops are formed in a chain in which the knots contact one another while the opposing ends of the loops form the opposing exposed loops. For example, in a preferred embodiment, a first loop is formed by tying a knot in a length of rope. Another length of rope has one end that passes through the first loop, and that end is then tied with the other end of the length of rope forming a second loop. The loops are positioned so the knots abut one another, but the loops are free floating in that they can be positioned for contact of the knots, or can be moved in an opposite direction so the knots are not in contact and the loops are moved closer to one another.

The fabric material covers the interlocking knots, such that the knots are hidden from view. The exposed portions of the rope material include a portion of the loop(s), which form handles. At one end of the toy, the fabric can be sewn to respective sections of one of the loops to simulate legs of an animal. At the other end, the fabric material can be sewn to the sections of the other loop to stimulate the mouth or head of the toy. The fabric is loose enough so the loops can be pushed toward or pulled away from one another without transferring force directly to the fabric material. In other words, because of the interlocking configuration of the knots, the loops may be pushed toward one another or pulled away from one another, but the push/pull action does not directly transfer the force to the fabric material since enough slack exists in the fabric material to accommodate the retraction and full extension of the loops.

In another preferred rope support configuration, it is contemplated that additional loops could be formed between the first and second loops, thus creating a configuration of rope having a greater length with additional knots.

In another preferred rope support configuration, multiple strands of rope material are tied in a series of knots to support the torso or middle portion of the body. One end of one or more strands of the rope material may extend beyond the body to provide a grasping means for the animal or pet owner. One or more additional strands of rope material may be tied to the multi-strand knot configuration and may extend in a transverse direction in order to provide additional internal support to the body of the toy, to include support for one or more appendages of the body such as legs.

In another preferred embodiment, in lieu of an exposed loop, one or more free ends of the lengths/strands of rope material extend beyond the body of the pet toy and are exposed for grasping by the animal or pet owner.

In yet another preferred embodiment, the rope support configuration may be wholly contained within the body of the toy with no protruding loops or free ends.

The fabric material may be formed in the shape of an animal. The fabric material may include identifying features, such as, eyes, ears, legs, and a tail. In one preferred embodiment, the fabric may be formed in the shape of a rabbit or other small animal.

The interlocking knots disposed within the fabric material effectively simulate the body of an animal without having to use stuffing within the pet toy. These knots therefore provide a robust construction in which an animal may bite down and hold the body of the toy without transferring all of the biting force only to the fabric material. Rather, the animal's mouth will transfer a significant amount of force to the knots, and therefore, the exterior fabric material can be preserved longer. The knots can be tied to provide different levels of internal bulk within the body of the toy. For example, providing double or triple knots for one or more of the loops can provide adequate bulk to effectively stuff the toy without using traditional stuffing material. The increase in rope knot bulk further assures less stress placed on the fabric exterior when the toy is pulled or twisted.

The rope material is selected considering factors that will ensure the rope material is not shredded or frayed when subjected to the biting action of the animal. One factor is a selection of the type of rope material, which is preferably cotton or cotton blend; however, synthetic materials could be used as well as other durable natural fibers that are resistant to fraying. Stiff and relatively non-flexible fibers such as hemp are more difficult to use in the invention without fraying.

Other factors to consider are the tightness of the weave, the number of twists between the rope strands over a length, and the number of strands used in the rope. Preferably, the twist pattern is tight to prevent the animal's teeth from easily separating the strands, and the number of twists is maximized for the number of strands used per length of rope material. For example, if a three or four strand twisted pattern or braided pattern is selected, then the rope twists or braids per unit length would be maximized to minimize gaps or spaces between the strands that otherwise can make it easier for an animal's teeth to separate and shred or fray individual fibers in a strand. In other words, the gaps between the knots are minimized by use of sufficient force to prevent apparent looseness between the knots. Sufficient force can be defined by the force of a person tying the knots in which the free ends are pulled tightly. Sufficient force does not require additional force as could be provided by a machine; however, for purposes of automation, a machine of course could be used to tie the knots.

Other features and advantages of the invention will become apparent from a review of the drawings taken in conjunction with the detailed description.

BRIEF DESCRIPTION OF THE DRAWINGS

FIG. 1 is a plan view of an embodiment of the present invention;

FIG. 2 is a rear view of FIG. 1;

FIG. 3 is a front view of FIG. 1;

FIG. 4 is an elevation view of FIG. 1;

FIG. 5 is a partial cross sectional view of FIG. 4 showing the configuration of the rope within the fabric cover;

FIG. 6 is an enlarged fragmentary cross sectional view of the left end of FIG. 4 showing how the first loop is attached to the fabric material;

FIG. 7 is an enlarged fragmentary cross sectional view of the right end of FIG. 4 showing how the second loop is attached to the fabric material;

DETAILED DESCRIPTION

Figure 8:
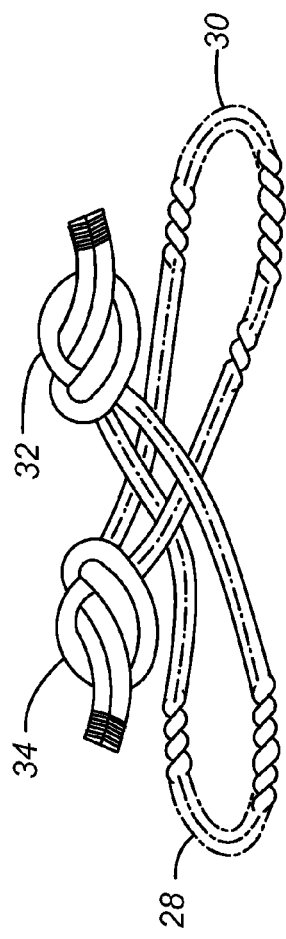
FIG. 8 is an isometric view of the rope configuration with the fabric removed and showing how the rope loops are arranged, and further showing the loops in a retracted position.

FIGS. 1-4 illustrate a first preferred embodiment of the invention. The invention is a toy 10 characterized by a fabric body 12 with two prominent loops 28 and 30 formed on opposite ends of the toy. In FIG. 1, the toy is formed in the shape of a rabbit. Accordingly, the fabric is shaped and sewn in a pattern to represent features of the animal to include the body 12, hind legs 14, a head 16, ears 18, eyes 20, and tail 21. As best seen in FIG. 4, the front portion of the toy includes two front interface areas 24 where the sections of the rope loop 28 extend through the fabric. At these two front interface areas 24, the fabric is sewn, fused, or otherwise joined to the rope so that the rope will not separate from the fabric material. Similarly, at the rear or opposite end of the toy, a pair of rear interface areas 26 is located where the fabric material is joined to the rope loop 30. The loop extensions 29 of the rear loop 30 simulate the lower portions of the legs 14.

Figure 9:
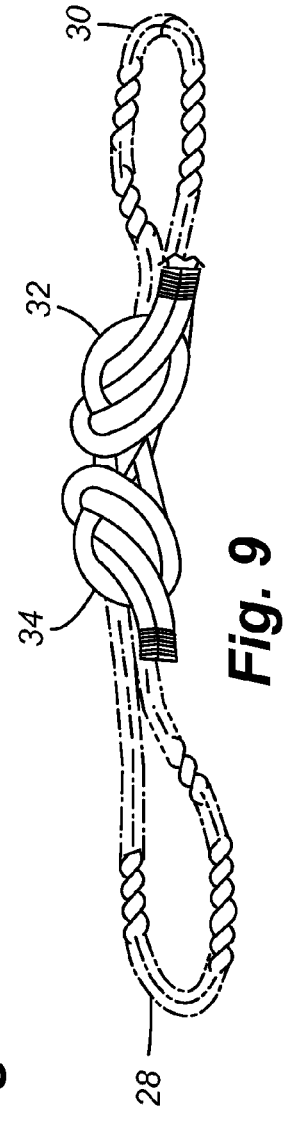
FIG. 9 is an isometric view of the rope configuration of FIG. 8 showing the loops in a an extended position.

Referring to FIGS. 5, 8 and 9, the loop configurations are illustrated for the first embodiment. The front loop 28 includes a knot 32, and the rear loop 30 includes its corresponding knot 34. As shown, the loops are joined by crossing the rope material thereby interlocking the loops to one another. The particular knots may include overhand knots, square knots, and others. The type of knot can be chosen to adjust the amount of internal bulk desired within the pet toy to simulate an animal or body parts of the animal. For example, a series of knots used with the loops can be tied to simulate an animal's ribcage. The knots 32 and 34 provide internal structure for the toy, thereby eliminating the need for stuffing or other filler material. In the Figures, the knots are shown as being overhand knots, however, as mentioned, other types of knots could be used to add or reduce the mass of the knots in order to best simulate the torso or other parts of the animal. Additionally, more than one knot can be tied for each loop that will also increase the internal bulk of the pet toy.

In FIG. 6, it is also shown that the simulated head 16 of the animal is supported internally with the looped rope material 28, thereby helping to prevent the head of the animal from being ripped or torn from the body. The head 16, body 12, and rear legs 14 are aligned along a longitudinal axis A-A as shown in FIG. 1. The rope material extends the length of the pet toy and the linear relationship of the fabric mounted over the rope material results in no significant part of the pet toy that is not substantially supported with the knots or the looped portions of the rope. The ears 18 do freely extend from the body, however, it is also contemplated that another loop, such as the third loop 40 in FIG. 10, could be used to extend around the periphery of the ears, or could protrude through the ears to expose a third loop for tugging action.

FIGS. 6 and 7 illustrate in better detail the interface areas in which the rope is secured to the fabric. FIG. 6 shows the front interfaces 24 in which the rope material is sewn to the front loop extensions 27, and FIG. 7 shows the rear interfaces 26 in which the rope material is sewn to the rear loop extensions 29. In lieu of sewing, the fabric may be secured to the rope material by epoxy or heated fusion in which a plastic heat shrinkable material (not shown) may be melted to fuse the rope material to the fabric material at each interface.

An amount of fabric material is used in the toy such that when the loops 28 and 30 are pulled away from one another, the fabric has some slack so that excessive force is not transferred to the fabric that could otherwise result in tearing or damage to the fabric material. The loops 28 and 30 also are allowed to move freely towards one another when tension force is released from the looped ends. FIG. 8 shows the toy with the fabric removed to better view the rope configuration. FIG. 8 also shows the loops 28 and 30 in a retracted position in which the loops are moved toward one another. FIG. 9 shows the loops in a fully extended position in which the knots 32 and 34 contact one another. The loops 28 and 30 can be pushed, pulled, twisted, and otherwise manipulated without transferring excessive tension or torque to the fabric material. In this manner, the fabric material maintains its integrity for an extended period of time as compared to the prior art in which the full force of pulling or twisting is transferred to the fabric material, thereby reducing the life of the prior art toy.

Figure 10:
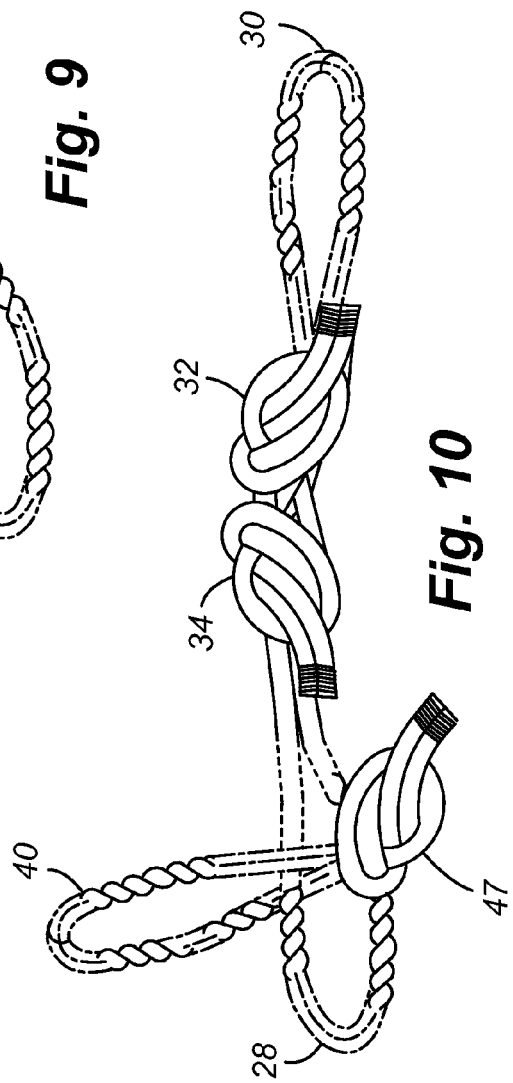
FIG. 10 illustrates another rope configuration in which three loops and three corresponding knots are provided.

Referring to FIG. 10, another rope/cord configuration is illustrated in which a third loop 40 is used, the third loop having its own knot 47. This rope configuration therefore includes three loops of material with three corresponding knots. When the loops are extended, this particular arrangement may be advantageous for providing a pet toy having a greater length, or for simulation of an animal having a thinner body, such as a snake. In the embodiment of FIG. 1, the third loop 40 could be used to internally support the ears as mentioned.

Figures 11, 12:
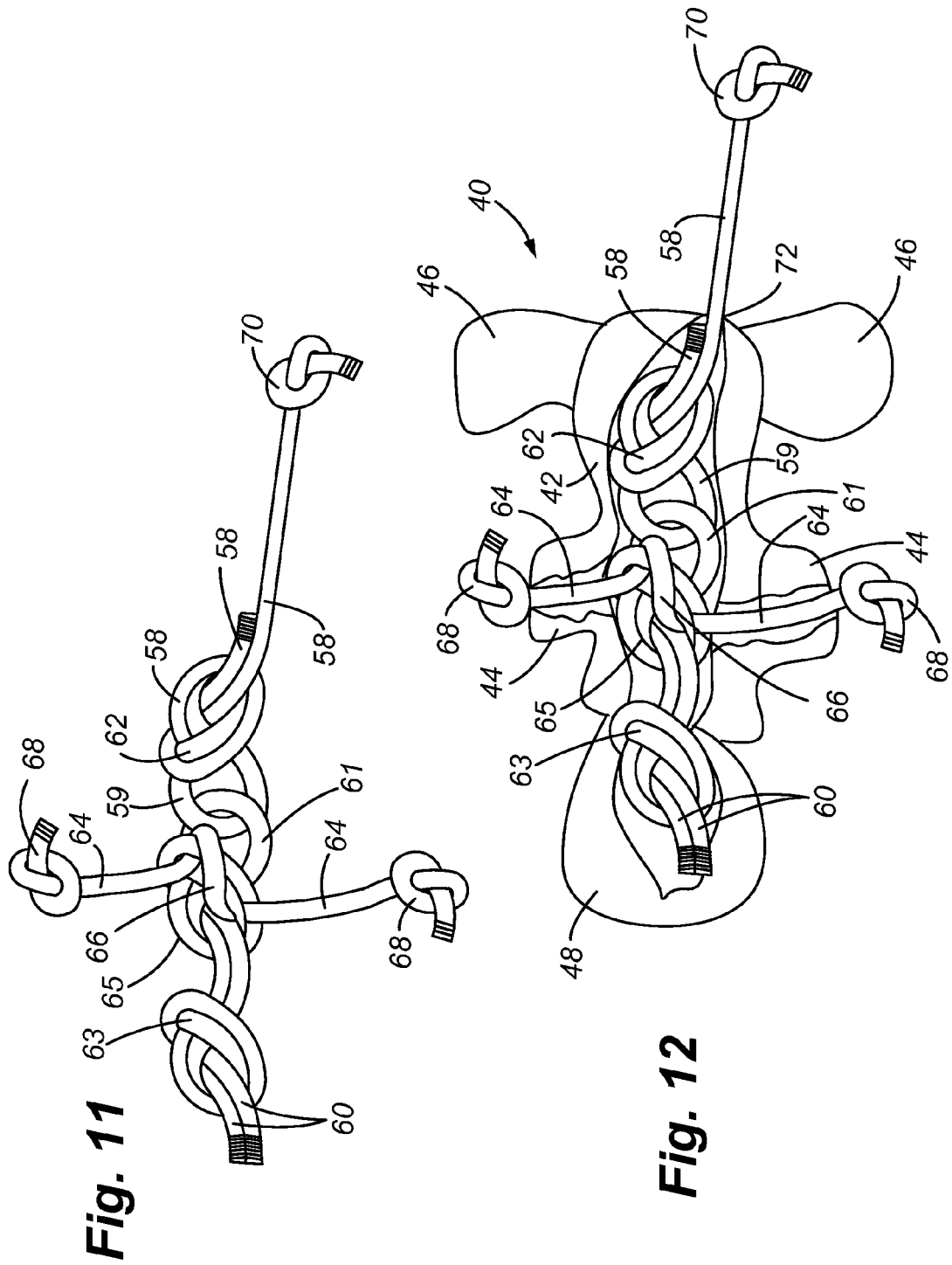
FIG. 11 illustrates a plan view of another rope configuration.
FIG. 12 illustrates the rope configuration of FIG. 11 in a partial cutaway plan view of another embodiment in which portions of the fabric covering are removed, and a central or longitudinal series of knots is formed with multiple strands of rope material, one of the strands extends beyond the body and is exposed, and another strand of rope material is tied to the central series of knots and extends transversely to the longitudinal series of knots.

Referring to FIGS. 11 and 12, another preferred embodiment is shown of the pet toy 10. In this embodiment, in lieu of providing exposed loops of rope material, one or more lengths of rope material may be exposed that extend beyond the body of the toy. In this embodiment, the toy 40 is characterized by a body 42 having a pair of front legs or appendages 44, rear legs or appendages 46, and a head 48. For the rope support configuration, a first strand 58 is doubled and a knot 62 is formed on the doubled strand 58. A loop 59 is also formed with the first strand 58 as shown. Similarly, a second strand 60 is doubled and a knot 65 is formed on the doubled strand 60. A loop 61 is also formed with the second strand 60 as shown and the loop 61 connects to the loop 59. The second strand 60 also has an overhand knot 63 formed closer to the free ends of the strand 60. The strands 58 and 60 with the various knots and loops extend with one another longitudinally along the pet toy. This knot configuration can substantially fill the body or torso 42. FIG. 12 also shows that one end of the strand 58 extends beyond the body, and this portion of the strand is exposed for grasping by the pet owner or animal. The strand 58 protrudes through the body at an interface 72 formed as an opening in the fabric of the body. Optionally, an end knot 70 may be tied, or additional knots may be tied on the exposed portion of the strand 58. FIGS. 11 and 12 also illustrate a third strand of rope material 64 that extends transversely with respect to the first and second strands. More specifically, the third strand 64 is secured to the other strands by a cross or wrap 66 of the strand 64 that is interlaced with the knot 65 of the strand 60. Additionally, the third strand 64 may include end knots 68 tied at both opposite ends as shown. The third strand 64 may be wholly contained within the body 42, and may therefore support one pair of the legs 44 as shown. An additional transverse strand could be provided (not shown) to support the hind legs 46 as well. In this embodiment, substantial internal support is provided for the body by the plurality of knots. Additionally, the transverse extending third strand 64 provides robust support for the appendages.

Although the prior embodiments show at least one loop or end of a rope strand exposed, it is also contemplated that all of the rope support configurations may be contained wholly within the body of the pet toy. Despite the specific rope configurations among the different embodiments, it is clear that use of the ropes with the knots provides robust support for the fabric body and thereby increases the life of the pet toy.

A method of making a pet toy is disclosed in a first embodiment comprising providing first and second loops of material, each loop having a knot and the loops being linked to one another, providing a fabric covering over the first and second loops, each of the loops having a curved portion protruding from the body, each portion of the loops being located at opposite ends of the toy. The curved portions are especially adapted for grasping with a hand of an owner or a mouth of an animal. The fabric covering forming the body is sized to have slack when the loops are pulled apart extending the toy to a full length. The loops are linked to enable the loops to be pulled in opposite directions, thereby extending the toy to the full length without transferring excessive force to the fabric covering. The loops are free floating in that the fabric material does not inhibit retraction of the loops or twisting of the loops. When the loops are released from tugging, the loops can naturally collapse enabling the loops to move. The first loop extends through the fabric at a first end of the toy and the first loop has sections sewn to the fabric at two locations defining first interfaces between the rope and fabric. The second loop extends through the fabric at an opposite second end of the toy and the second loop has sections sewn to the fabric at two locations defining second interfaces between the rope and fabric. The multiple interlinked loop construction in this embodiment eliminates excessive tugging stresses on the plush component covering the toy. The interlinked loop construction also eliminates the need for stuffing, yet provides robust internal support and bulk for the body of the plush toy.

In accordance with another method, first and second lengths of rope material are provided. The series of knots are tied with the first and second lengths of rope to form a longitudinally extending series of knots. A loop can be formed for interconnecting the first and seconds lengths of rope. A third length of rope material is tied to the first and second lengths of rope, and the third length extends transversely as compared to the first and second lengths. A fabric covering is placed over the lengths of rope material, with one of the first and second lengths of rope having an end that protrudes through and beyond the fabric covering. The protruding end is especially adapted for being grasped by the hand of an owner or the mouth of an animal. The longitudinal series of knots can be arranged to substantially fill the fabric covering that forms a body of the pet toy. The third length of rope can be oriented to fill a pair of opposing appendages connected to the body.

The structure provided by the knots in each of the embodiments enables the animal to bite down with full force without destroying the fabric material, since much of the animal's bite is transferred directly to the knots as opposed to the fabric material. By choosing the number and type of knots, the body of the simulated animal can be effectively constructed without stuffing or other filler material. The animal also experiences a different feel when biting the body of the toy with the rope filled interior as opposed to traditional stuffing that is very soft and spongy. The rope is denser than traditional stuffing, and the fibers of the rope can aid in dental cleaning of the animal's mouth.

While the present invention has been disclosed with respect to one or more preferred embodiments to include an apparatus and method, it shall be understood that various other changes and modifications may be made to these preferred embodiments commensurate with the scope of the claims appended hereto.

What is claimed is:
1. A pet toy comprising:
a first loop having a knot;
a second loop having a knot and being linked with said first loop;
a fabric covering forming a body and being secured to said loops, portions of both of said loops being exposed and not covered by said fabric covering, said first loop located at a first end of the pet toy, and said second loop being located at a second opposite end of the pet toy; and
features formed on said body simulating an animal, said features including at least one of a head, ears, eyes, and legs; and wherein said knots are located within and covered by said body.
2. A pet toy, as claimed in claim 1, wherein:
said toy has a longitudinal axis, and said loops and said body are aligned along said axis.

3. A pet toy, as claimed in claim 1, wherein:
said loops protrude at respective interfaces of said body.

4. A pet toy, as claimed in claim 1, further including:
a third loop connected to one of said first and second loops and linked to said loops, said third loop having a knot.

5. A method of making a pet toy, said method comprising the steps of:
providing first and second loops of material, each loop having a knot and the loops being linked to one another;
providing a fabric covering over said first and second loops, each of said loops having a portion protruding from said fabric covering, said portion being located at opposite ends of said toy, said portions being especially adapted for grasping with a hand of an owner or a mouth of an animal;
sizing the fabric covering to have slack when the loops are pulled apart extending the toy to a full length;
wherein said loops are free floating to enable the loops to be pulled in opposite directions thereby extending the toy to the full length, and when releasing the loops, the loops can freely move apart from one another; and
wherein the loops can be pulled and released without directly transferring force to the fabric covering.

6. A method, as claimed in claim 5, wherein:
the first loop extends through the fabric at a first end of the toy and the first loop has sections sewn to the fabric at two locations defining a first interface between the rope and fabric; and
the second loop extends through the fabric at an opposite second end of the toy and the second loop has sections sewn to the fabric at two locations defining a second interface between the rope and fabric.

7. A pet toy comprising:
a first loop having a knot;
a second loop having a knot and linked with said first loop;
a fabric covering forming a body secured to said loops, a portion of said first loop being exposed and not covered by said fabric covering, a portion of said second loop being exposed and not covered by said fabric covering
features formed on said body simulating an animal, said features including legs and at least one of a head, ears, and eyes; and
said legs are formed at said second end and said second loop has loop extensions extending through each of said legs.

8. A pet toy, as claimed in claim 7, wherein:
said toy has a longitudinal axis, and said loops and said body are aligned along said axis.

9. A pet toy, as claimed in claim 7, wherein:
said knots are located within and covered by said body.

10. A pet toy, as claimed in claim 7, further including:
a third loop connected to one of said first and second loops and linked to said loops, said third loop having a knot.

11. A pet toy, as claimed in claim 7, wherein:
said first loop has a portion thereof extending through the head.

12. A pet toy, comprising:
at least a pair of strands of material having a plurality of knots and joined to one another;
a third strand tied to the pair of strands, and the third strand extending transversely to the pair of strands;
a fabric covering forming a body and said fabric covering enclosing respective portions of the pair of strands and third strand therein;
said pair of strands of material, further including a first loop and a second loop, said first loop located at a first end of the pet toy, and said second loop being located at a second opposite end of said pet toy, a portion of both of said loops being exposed and protruding from said fabric covering; and
features formed on said body simulating an animal, said features including at least one of a head, ears, eyes, and legs.

13. A pet toy, as claimed in claim 12, wherein:
said toy has a longitudinal axis, and said pair of strands with said knots extends along said axis.

14. A pet toy, as claimed in claim 12, wherein:
said third strand is tied to said pair of strands by wrapping said third strand around a portion of one of said pair of strands.

15. A method of making a pet toy, said method comprising the steps of:
providing first and second lengths of material;
tying a series of knots with said first and second lengths of material to form a longitudinal series of knots and interconnecting the knots with a loop formed for each of the first and second lengths of material;
providing a third length of material tied to said first and second lengths of material, said third length of material extending transversely as compared to the first and second lengths of material;
providing a body defined by a fabric covering placed over said first, second and third lengths of material, one of said first and second lengths of material having an end protruding through and beyond said fabric covering, said protruding end being especially adapted for grasping by a hand of an owner or a mouth of an animal; and
wherein said longitudinal series of knots are arranged to fill the body, and said third length of material is oriented to fill a pair of opposing appendages connected to the body.

16. A method of making a pet toy, said method comprising the steps of:
selecting material including cotton that is resistant to shredding;
providing first and second lengths of the material;
tying a series of knots with said first and second lengths of material to form a series of knots and interconnecting the knots with a loop formed for each of the first and second lengths of material;
minimizing gaps between the knots by tying the knots with sufficient force to prevent looseness between the knots;
providing a body defined by a fabric covering placed over said first and second lengths of material, one of said first and second lengths of material having an end protruding through and beyond said fabric covering, said protruding end being especially adapted for grasping by a hand of an owner or a mouth of an animal; and
wherein said series of knots are arranged to fill the body.

* * * * *